US005212865A

United States Patent [19]

Davis et al.

[11] Patent Number: 5,212,865

[45] Date of Patent: May 25, 1993

[54] TOOL FOR INSTALLATION OF TANGED AND TANGLESS WIRE INSERTS

[75] Inventors: Richard L. Davis, Alexandria, Va.; Frank J. Cosenza, Santa Barbara, Calif.

[73] Assignee: USI Corporation, Chantilly, Va.

[21] Appl. No.: 915,207

[22] Filed: Jul. 20, 1992

[51] Int. Cl.[5] .............................................. B23P 19/04

[52] U.S. Cl. .............................................. 29/240.5

[58] Field of Search ................. 29/240.5; 81/440–445, 81/450

[56] References Cited

U.S. PATENT DOCUMENTS

| | | | |
|---|---|---|---|
| 3,093,895 | 6/1963 | Eddy | 29/240.5 |
| 3,348,293 | 10/1967 | Newton et al. . | |
| 4,077,101 | 3/1978 | Wallace | 29/240.5 |
| 4,227,290 | 10/1980 | Wallace | 29/240.5 |
| 4,553,302 | 11/1985 | Cosenza et al. . | |

*Primary Examiner*—Robert C. Watson
*Attorney, Agent, or Firm*—Irving Keschner

[57] ABSTRACT

A multi-purpose tool for inserting tanged or tangless wire inserts in a pre-threaded hole. In the case of a tangless insert, the tool nose passes freely through the internal diameter of the insert until a tool pawl automatically engages a cut out formed in the tangless insert. Once the proper depth of the insert in the parent material has been achieved, the tool stops rotating and is reversed for proper disengagement, the installation being complete. In the case of a tanged insert, the nose of the tool does not pass freely through the insert due to the presence of the tang that is blocking its way. As the tool rotates through the internal diameter of the insert, a ledge formed on the nose portion of the tool forces the insert to wind itself in the threads of the parent material. The pawl used to install the tangless insert is positioned directly behind the nose of the tool and remains inoperable in the retracted position since the insert does not have a cut out provided for it. After proper depth of the insert has been achieved, the tool stops rotating and is reversed for proper disengagement.

4 Claims, 3 Drawing Sheets

TOOL FOR INSTALLATION OF TANGED AND TANGLESS WIRE INSERTS

BACKGROUND OF THE INVENTION

1. Field of the invention

The present invention provides an improved installation tool which can install both tanged and tangless inserts in a pre-threaded hole.

2. Description of the Prior Art

Historically, there has been one kind of helical wire formed insert. This insert is installed in a pre-threaded hole by the use of a tool that grasps the tang portion of the insert and enables the insert to be rotated to its proper depth in the threaded hole. In order to complete the installation of a tanged insert, the tang must be broken off, removed and accounted which increases the cost and time of installation.

In recent years, inserts have been introduced into the marketplace which do not require the removal of a tang and the attendant costs of installation because the insert does not include a tang. A prior art insertion tool for tangless wire coil inserts is described in Cosenza et al. U.S. Pat. No. 4,553,302. The tool includes a moveable pawl that automatically locks into a cut out formed in the lead thread of the insert rotation of the tool (insert) positioning the insert into a pre-threaded hole, thus completing installation of the insert.

Both the tangless and tanged wire coil inserts are currently being utilized and until either insert becomes the standard, installers of wire formed inserts will be faced with utilizing both types of inserts which, in turn, requires two separate tools for installation.

What is therefore desired is to provide a single installation tool which can install both tanged and tangless wire inserts.

SUMMARY OF THE PRESENT INVENTION

The present invention provides a multi purpose tool for installing helical wire formed inserts of either the tanged or tangless type into a pre-threaded hole. For tangless versions of the insert, the tool nose passes freely through the internal diameter of the insert since there is no tang to stop the movement of a tool until a pawl positioned within the tool body automatically engages the cut out formed in the lead thread of the insert. After the proper depth of the insert in the parent material has been achieved, the tool stops rotating and is reversed for proper disengagement and the installation is complete. If the insert to be installed is a tanged version, the operator proceeds with the installation in the same manner as with the tangless version. In this case, the nose of the tool does not pass freely through the insert due to the presence of the tang that blocks its way. As the tool rotates through the internal diameter of the insert, a ledge portion formed on the nose portion of the tool forces the insert to wind itself in the threads of the parent material. At this time, the pawl that is directly behind the nose of the tool remains ineffective in a retracted position since there is no cut out provided for the pawl in the insert. After the proper depth of the insert has been achieved, the tool stops rotating and it is reversed for proper disengagement. As is common with tanged inserts, the installation is not complete until the tang portion is broken off, removed and accounted for.

The present invention thus provides a multi-purpose tool which can install either tangless or tang inserts into a pre-threaded hole in a parent material. The operator thus does not need to separate inserts during the installation cycle and only requires a single tool to do installations of both, thus reducing capital and labor costs.

DESCRIPTION OF THE DRAWING

For a better understanding of the invention as well as other objects and features thereof, reference is made to the following description which is to be read in conjunction with the accompanying drawing wherein.

DESCRIPTION OF THE INVENTION

The tool of the present invention is adapted for use with both tanged and tangless coils which are used, for example, where a steel alloyed bolt having conventional threads is desired to be fastened into a material of relatively softer material, such as aluminum.

Figure 1:
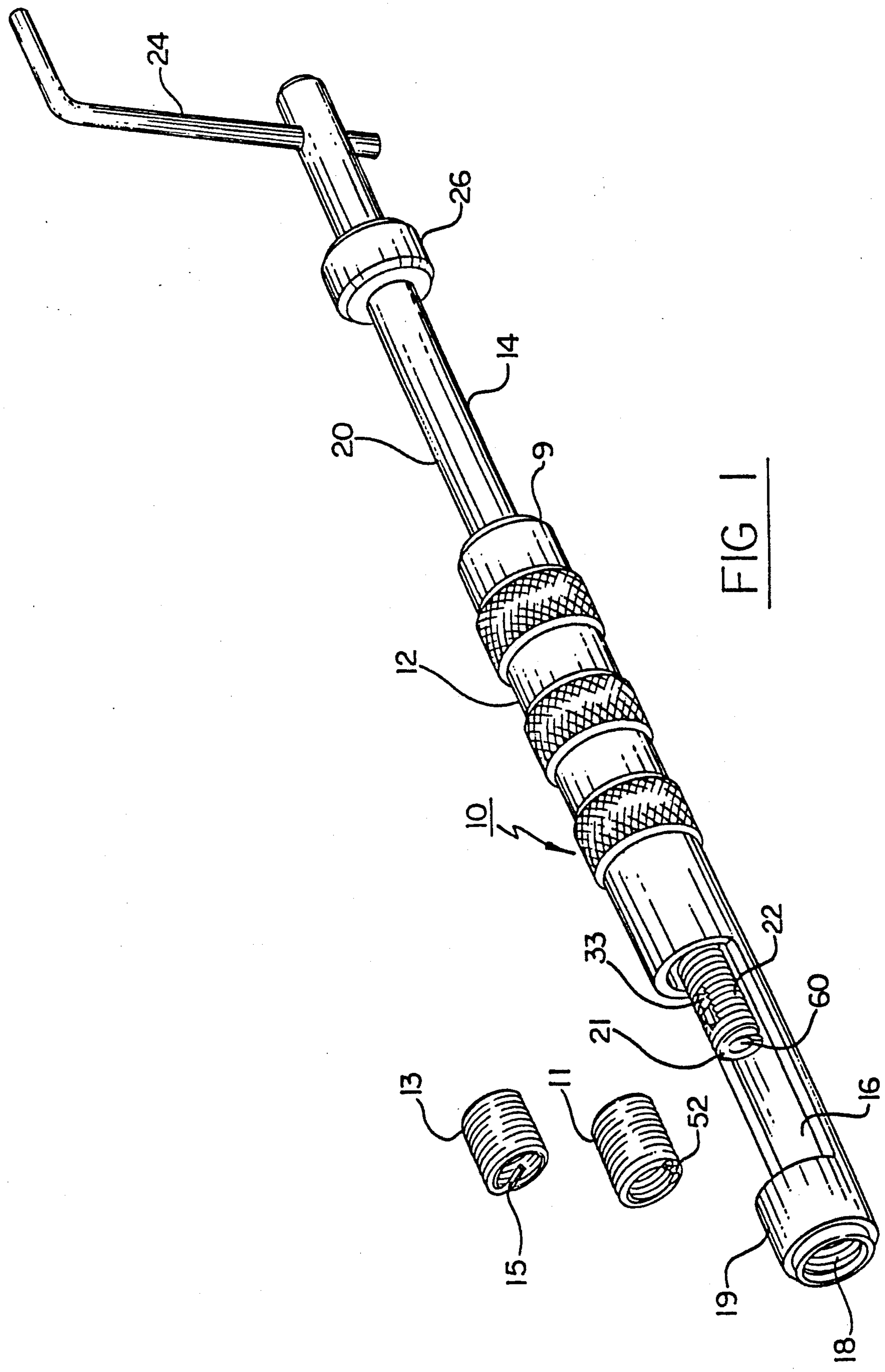
FIG. 1 is a perspective view of a multi purpose tool in accordance with the teachings of the present invention and also illustrating tangless and tanged helical coiled inserts.

As illustrated in FIG. 1, the installation tool 10 of the present invention is comprised of two major portions: a tubular body member 12, and a mandrel assembly 14 insertable into the tubular body and adapted to receive a tanged or tangless insert which is to be threaded into a tapped hole. The tubular body member 12 provides, in part, the operator with a means for supporting the mandrel assembly 14 in order to install the insert correctly during operation. The tubular body member 12 may include a loading window 16 for supporting an insert for quick reloading, a coil alignment portion 19, and a coil sizing portion, or prewinder, 18 which reduces the coil thread diameter for smooth transition into the tapped hole.

The mandrel assembly 14 is insertable into the tubular body member 12 and is adapted to receive the tangless or tanged insert 11 and 13, respectively, for installation into a tapped hole. The mandrel assembly 14 comprises a cylindrical rod 20 of a diameter substantially equal to the inner diameter of the tubular body member 12. The lead end 22 of the rod 20 is threaded and has a diameter according to the inner diameter that insert 11 (tangless) on 13 (tanged) will have when in its contracted state. This means the diameter of lead end 22 is somewhat smaller than the inner coil diameter of inserts 11 and 13 prior to the application of the tool. At the end opposite the lead end 22 there is generally a crank handle 24 for applying torque for installing the insert into a tapped hole. The crank handle 24 may be replaced at the driver end of the cylindrical rod 20 with a shaped portion, to which a wrench may be applied.

Figure 2:
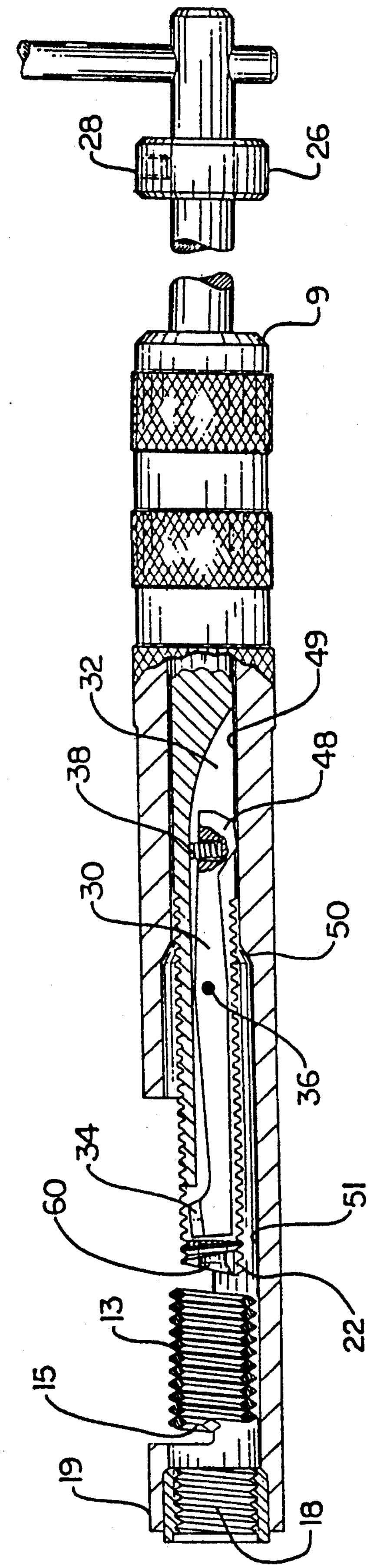
FIG. 2 is a side elevation, partially broken away, of the tool of FIG. 1 with the pawl pivoted inwardly.

Further, as illustrated in FIGS. 1 and 2, an adjustable stop collar 26 serves as an abutment with the end portion 9 of tubular body member 12, thereby limiting the distance that the lead end 22 of the rod 20 may project out of the coil sizing portion 18 of the tubular body member 12, thus defining the proper depth to which the inserts 11 or 13 may be installed in a tapped hole. A set screw 28 or other means is provided in the adjustable stop collar 26 to secure the stop in its proper position.

Figure 3:
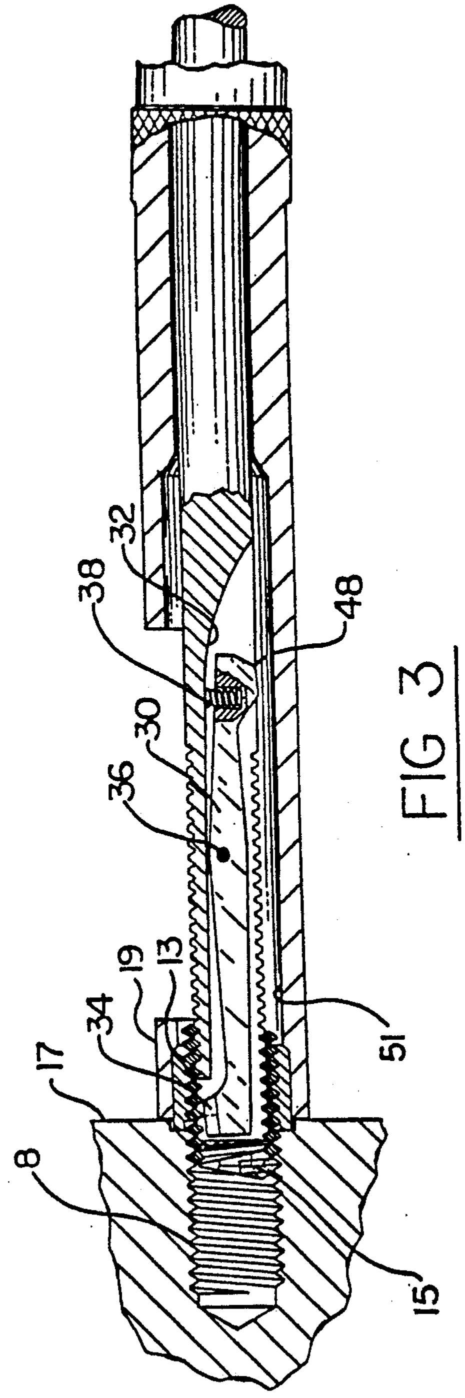
FIG. 3 is a side elevation of the tool, of the present invention showing the position of the pawl prior to the prior to the installation of the tanged insert into a tapped hole.
Figure 4:
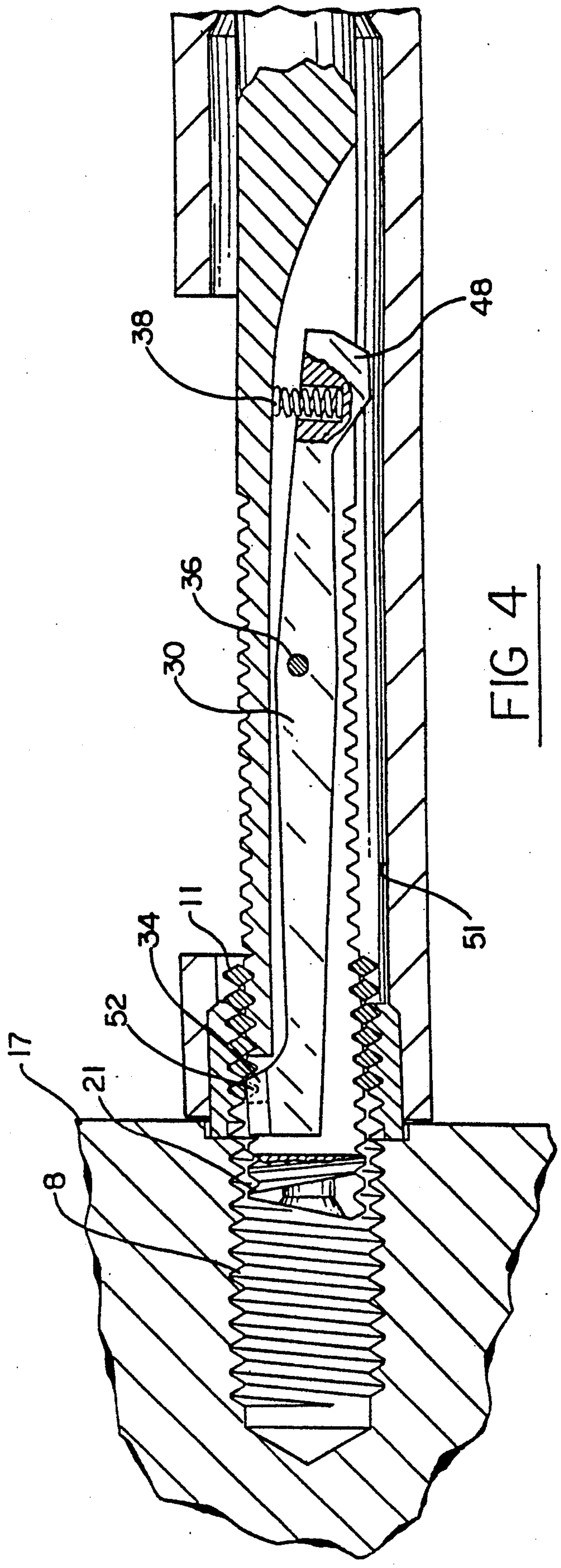
FIG. 4 is a side elevation view of the tool of the present invention showing the position of the pawl prior to the installation of the tangless insert into a tapped hole.

FIGS. 2 and 3 illustrate a pivotable catch or pawl 30, constructed in accordance with one of the embodiments disclosed in U.S. Pat. No. 4,553,302, in an elevation sectional view within a longitudinal cutout 32 of mandrel assembly 14. The cutout 32 generally does not extend through the front end 22 of the rod 20, but is generally equal in length to the pawl 30. The pawl 30 is biased within the cutout 32 so that a hook portion 34 protrudes through aperture 33 and engages the recess 52 of the tangless wire coil insert 11 (FIG. 4). The pawl 30 is generally biased about pivot point 36 by spring 38 to locate the hook portion 34 into the recess of the tangless insert when the tangless insert 11 is screwed onto the lead end 22 of the mandrel assembly 14 and the mandrel assembly 14 is axially moved in the tubular body 12 so that the cam means 48 moves from the smaller inner diameter portion 49 of tubular body 12 along ramp 50 to the larger inner diameter 51. As will be set forth hereinafter, if a tanged insert 13 is to be utilized pawl 30 remains in the inoperative position since there is no recess to receive hook portion 34.

As illustrated in U.S. Pat. No. 4,553,302, the teachings of which that are necessary for an understanding of the present invention being incorporated herein by reference, when tangless insert 11 is utilized, hook portion 34 of pawl 30 engages a recess 52 formed in the lead end of the insert in order that the insert 11 may be screwed by means of the tool 10 into a tapped hole. Since both free ends of the tangless helical coiled insert generally have such recesses cut therein, the insert 11 may be inserted in the tool in either direction, thus eliminating the possibility of the operator inserting on the tool in the wrong direction. The details of removing the tool after installing insert 11 and reinsertion thereof are shown in the aforementioned patent.

In accordance with the teachings of the present invention, the front end 22 of rod 20 is increased in length when compared to the length of the rod shown in U.S. Pat. No. 4,553,302 in order to form a ledge portion 60 on front end 21 or rod 20. Cutout 61 formed in ledge portion 60 captures tang 15 of tanged insert 13 and applies a force thereto causing insert 13 to wind itself in the threads of parent material 17. The configuration of ledge portion 60 is similar to those on tools currently utilized to install tanged inserts such as that shown in U.S. Pat. No. 3,348,293 or tools available from Camloc Products, Hasbrouck Heights, N.J., such as the Prewinder, Capture Sleeve Type, Style 2 model.

In operation, if an operator first selects tangless insert 11, then the tool of the present invention functions like the tool disclosed in U.S. Pat. No. 4,553,302. That is, the front end, or nose, 21 of the tool passes freely through the internal diameter of insert 11 (since there is no tang to stop it) until the pawl 30 automatically engages the appropriate cutout 52 of the tangless insert 11. As the tool continues to rotate within the internal diameter of insert 11, the insert is forced to wind itself in the threads of parent material 17 in a conventional manner. Once the proper depth of the insert 11 in the parent material 17 has been achieved, the tool stops rotating and is reversed for proper disengagement and installation is complete. If the next insert to be installed is a tanged version such as insert 13, the operator then proceeds with the installation exactly the same as for the tangless version. The front end, or nose, 21 of the tool, however, does not pass freely through the insert 13 due to the presence of the tang 15 that is blocking its way. As the tool continues to rotate to within the internal diameter of the insert 13, the ledge 60 formed in nose portion 21 captures tang 15 and forces the insert 13 to wind itself in the threads of the prewinder 18 and then the parent material 17 in a conventional manner. Although mandrel assembly 14 is moved axially in tubular body 12 so that cam means 48 moves from the small inner diameter portion 49 of tubular body portion 12 to larger diameter 51, the pawl 30 directly behind nose 21 remains ineffective in the retracted position since there is no cutout provided for it in the insert 13. When proper depth of the insert has been achieved the tool stops rotating and is reversed for proper disengagement. Complete installation of a tanged insert requires break-off of the tang and its removal and accountability.

FIG. 4 illustrates the installation of a tangless insert 11 into the threads of prewinder 18 with the nose portion 21 extending into tapped hole 8. As noted hereinabove, the installation procedure is identical to that described in U.S. Pat. No. 4,553,302.

Figure 5A:
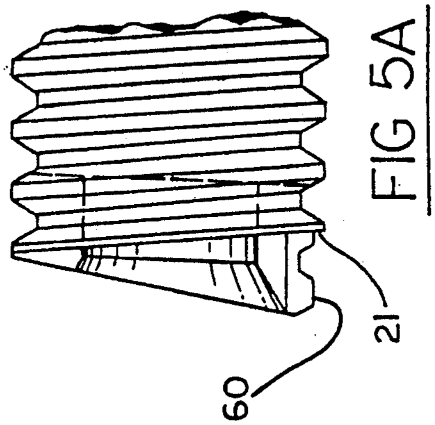
FIGS. 5A and 5B are detail views of the nose tip of a mandrel assembly utilized in the present invention.
Figure 5B:
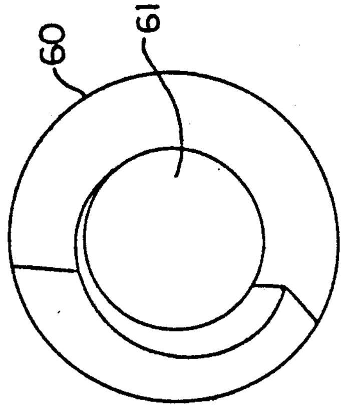

FIG. 5A shows in more detail the side view of nose portion 21 of mandrel 22 with ledge portion 60 and FIG. 5B is a front view of the detail shown in FIG. 5A.

The present invention thus provides a multi-purpose tool which can function easily with either a tanged or tangless insert. The operator does not need to separate the inserts during the installation cycle. Since the hole preparation is identical for both types of inserts, the operator simply uses this tool in the normal manner thus reducing both labor and capital costs.

Although the invention has been described in reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A tool for inserting either a tangless or tanged helically coiled insert in a tapped hole, the tangless helically coiled insert having at least one free end with a recess in the inner thread of the free end and said tanged insert having a tang at one end thereof said tool comprising:

- a tubular body of substantially circular cross-section, said body including a portion at one end thereof having an aperture therein adapted to receive either a tangless or tanged helically coiled insert;
- a mandrel insertable into said tubular body and adapted to receive the tanged or tangless insert for installation in the tapped hole, said mandrel having a portion with a cavity therein;
- driving means at one end of said mandrel for applying a torque sufficient to move said mandrel forward in a first direction to install either the tanged or tangless insert in a tapped hole, said mandrel having a threaded portion at an end opposite said driving means and adjacent said body aperture for threading the tangless and tanged helically coiled inserts thereupon, said mandrel threaded portion having a nose portion with a device to engage the tang of a tanged insert formed thereon;

a pivotable pawl having a laterally projecting hook means biased in a first direction and extending longitudinally in said mandrel cavity adjacent said mandrel threaded portion, said pawl having a free end with means laterally projecting adapted to project through an opening formed in said mandrel for automatically locating said pawl within the tangless insert at the insert recess as said mandrel is rotated in a clockwise direction, said pivotable pawl engaging the recess in said tangless helically coiled insert if said tangless helically coiled insert is received in said aperture whereof said mandrel is engaged with said tangless insert for simultaneous movement of said mandrel and said tangless insert, said nose engagement device engaging the tang portion of said tanged insert if said helically coiled tanged insert is received in said aperture whereby said mandrel is engaged with said tanged insert for simultaneous movement of said mandrel and said tanged insert.

2. The tool as defined in claim 1 wherein said mandrel opening is positioned relative to said nose engagement device in a manner such that the laterally projecting means is prevented from projecting through said mandrel opening as said mandrel is moved forward if a tanged insert is positioned in said aperture.

3. The tool as defined in claim 1 wherein said nose engagement device is formed on said mandrel threaded portion in a manner such that it passes through said tangless insert as the mandrel moves in said first direction enabling said projecting means to extend through said mandrel opening and engage the recess formed in said tangless insert.

4. The tool as defined in claim 3 wherein said nose engagement device comprises a cutout portion.

* * * * *

UNITED STATES PATENT AND TRADEMARK OFFICE
CERTIFICATE OF CORRECTION

PATENT NO. : 5,212,865

DATED : May 25, 1993

INVENTOR(S) : Richard L. Davis and Frank J. Cosenza

It is certified that error appears in the above-identified patent and that said Letters Patent is hereby corrected as shown below:

On title page, item [73],

"USI" should read —VSI—.

Signed and Sealed this

Eighteenth Day of January, 1994

Attest:

Bruce Lehman

BRUCE LEHMAN

*Attesting Officer* *Commissioner of Patents and Trademarks*